March 7, 1933. G. B. FISHER 1,900,701
PLOW
Filed Feb. 16, 1931
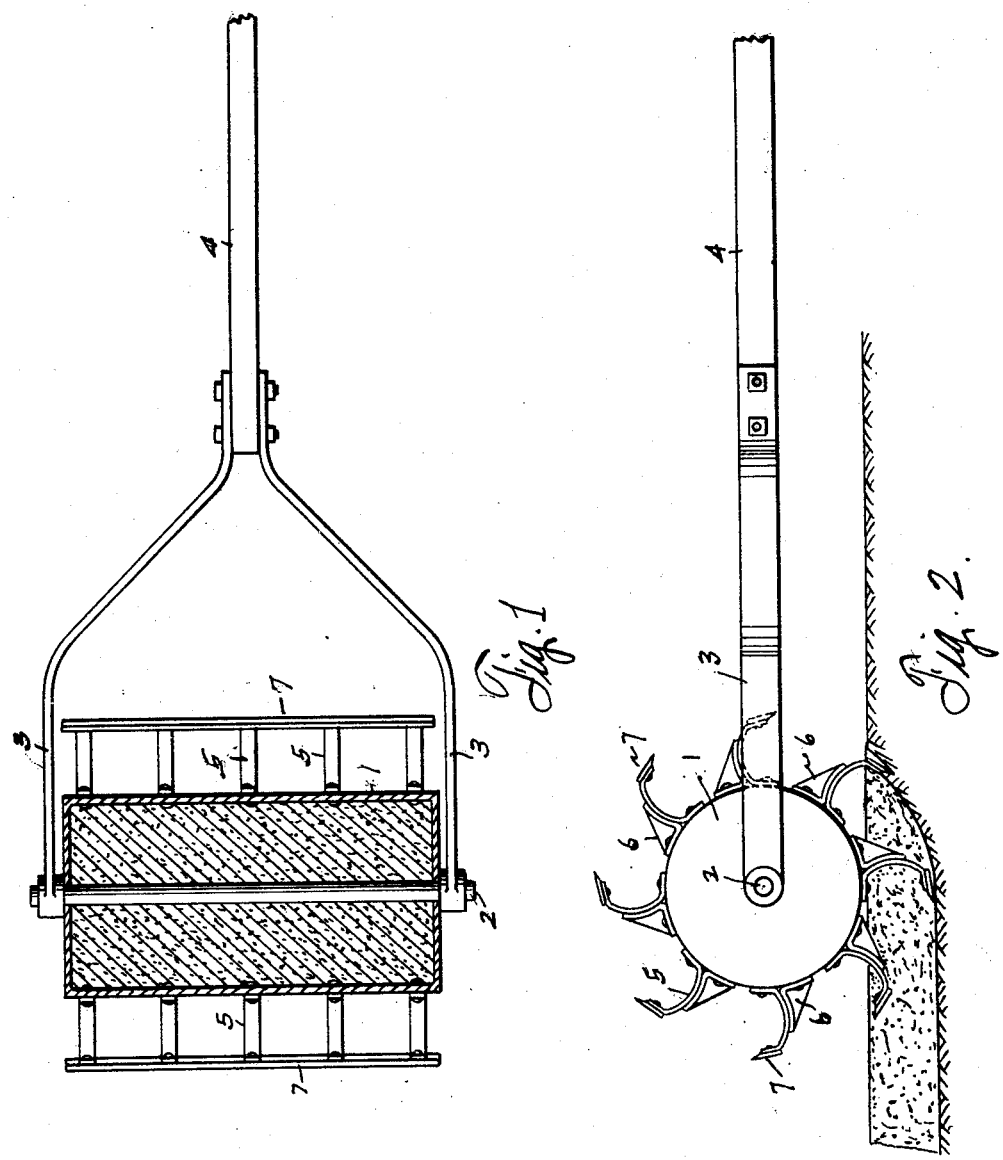
Inventor
Guy B. Fisher
By Hardway Rathey
Attorneys Patented Mar. 7, 1933

1,900,701

UNITED STATES PATENT OFFICE

GUY B. FISHER, OF BLANDLAKE, TEXAS

PLOW

Application filed February 16, 1931. Serial No. 515,992.

This invention relates to new and useful improvements in plows.

One object of the invention is to provide an agricultural implement of the character described specially designed for pulverizing the ground preparatory to planting.

Another object of the invention is to provide a plow of the character described which will be light running and at the same time will have greater capacity than the ordinary plow now commonly used and which will thoroughly pulverize the earth and leave it in a smooth even condition for further cultivation.

With the above and other objects in view the invention has particular relation to certain novel features of construction, operation and arrangement of parts, an example of which is given in this specification and illustrated in the accompanying drawing, wherein:—

Figure 1 shows a plan view of the plow partly in section, and

Figure 2 shows a side elevation thereof.

In the drawing the numeral 1 designates a drum of any selected construction and of the desired weight. As shown, this drum is formed of hollow metal filled with concrete or other suitable material and is provided with the axle 2 whose ends project beyond the ends of the drum. There are the side bars 3, 3 whose rear ends have bearings on the projecting ends of the axle and whose forward ends are inwardly turned and fastened to the tongue 4 and whereby the plow may be drawn by draft animals, or by a tractor, if desired.

Fastened to the periphery of the drum are a series of forwardly curved arms 5, the series being spaced apart around the drum and the arms of each series being also spaced apart. The arms may be reinforced, if found necessary, by the brackets 6 which are fastened to the periphery of the drum and rest against the rear sides of the respective arms.

There are the lengthwise blades 7 secured to the outer ends of the respective series of arms. These blades are forwardly directed and the forward edges of these blades are formed into sharp cutting edges. As the plow moves forwardly the blades will penetrate into the ground one after the other as indicated in Figure 2 throughout their entire length, the roller 1 being supported on the plowed surface of the ground. As the plow moves forwardly the blades and arms will move upwardly through the plowed earth and will emerge in the rear of the roller 1 and as they pass upwardly through the loose earth they will break up the earth and leave it in pulvarized and tillable condition. The plow will be comparatively easy to operate and will require less power in plowing a given area than will be required for doing the same work with plows now in common use for a similar purpose.

The drawing and description disclose what is now considered to be a preferred form of the invention by way of illustration only, while the broad principle of the invention will be defined by the appended claim.

What I claim is:

A plow comprising a cylindrical drum like roller having an outer shell and a filler therein forming a weight, outwardly extending forwardly curved arms thereon and spaced apart, lengthwise blades on the outer ends of the arms, which extend approximately from end to end of the drum, and have forwardly directed cutting edges and brackets secured to the drum and resting against the rear sides of said arms.

In testimony whereof, I have signed my name to this specification.

GUY B. FISHER.